United States Patent

[11] 3,626,333

[72] Inventor Tingye Li
Middletown, N.J.

[21] Appl. No. 861,761
[22] Filed Sept. 29, 1969
[45] Patented Dec. 7, 1971
[73] Assignee Bell Telephone Laboratories Incorporated
Murray Hill, Berkeley Heights, N.J.

[54] AUTOMATIC EQUALIZER EMPLOYING BULK SEMICONDUCTOR DEVICES

3 Claims, 3 Drawing Figs.

[52] U.S. Cl. .......... 333/28, 307/229, 333/70 T
[51] Int. Cl. .......... H03h 5/00
[50] Field of Search .......... 307/229, 299; 333/18, 28, 70 T; 331/107 G; 317/234 (10)

[56] References Cited

UNITED STATES PATENTS 3,368,168 2/1968 Lucky .......... 333/18
3,414,819 12/1968 Lucky .......... 333/18 X

*Primary Examiner*—Stanley D. Miller, Jr.
*Attorneys*—R. J. Guenther and E. W. Adams, Jr.

ABSTRACT: An automatic equalizer employing *n* controlled waveform generators each of which uses a bulk semiconductor device having a series of contacts bonded to the surface with resistors, connected between the contacts. Each such generator has a domain nucleated in the semiconductor device at 1/*n*th the clock rate and the filtered output of one of the generators is connected to an output terminal when the digital input signal received over the transmission system in a pulse. The result is that pulses are distorted over *n* slots so as to minimize intersymbol interference when the pulses are transmitted over a distorting transmission channel. In a preferred embodiment of the invention the resistors connected between the contacts are photoconductors so that an adjusting signal driving a light source may rapidly change the values of the resistors and thereby adjust the equalizer.

PATENTED DEC 7 1971 3,626,333

INVENTOR
T. LI
BY [signature]
ATTORNEY

AUTOMATIC EQUALIZER EMPLOYING BULK SEMICONDUCTOR DEVICES

BACKGROUND OF THE INVENTION

The principal limitation on the rate of data transmission on voice telephone channels results from intersymbol interference, which is the distortion of data pulses so that they are spread out in time and overlap other transmitted pulses. To alleviate the effects of intersymbol interference it is necessary to equalize the voice telephone channels.

One of the most successful equalizers for digital communication on telephone channels is that disclosed by R. W. Lucky in the Feb. 1966 *Bell System Technical Journal*, Volume 45, pages 255–286. There an adaptive equalizer continually monitors channel conditions and is automatically adjusted when required so as to provide optimum equalization. The equalizer operates upon principles disclosed in an earlier article by R. W. Lucky in Volume 44 of the *Bell System Technical Journal* for Apr. 1965, pages 547–588. Briefly, that principle is that the intersymbol interference may be minimized by adjusting the potentiometer taps on a finite transversal filter. To accomplish automatic equalization requires constant and rapid readjustment of taps since these taps are driven by motors and the operation of the motors places a limitation on the speed at which the equalization can be changed.

It is an object of this invention to eliminate the motors and potentiometer taps previously used in automatic equalizers and to thereby eliminate the restrictions on the speed at which the equalization can be changed.

SUMMARY OF THE INVENTION

In accordance with this invention an automatic equalizer employs $n$ controlled waveform generators each of which uses a bulk semiconductor device having a series of contacts bonded to the surface with resistors connected between the contacts. Each such generator has a domain nucleated in the semiconductor device at $1/n^{th}$ the clock rate and the filtered output of one of the generators is connected to an output terminal when the digital input signal received over the transmission system is a pulse. The result is that pulses are distorted over $n$ times slots so as to minimize intersymbol interference. In a preferred embodiment of the invention the resistors connected between the contacts are photoconductors so that an adjustment signal driving a light source may rapidly change the values of the resistors and thereby adjust the equalizer.

BRIEF DESCRIPTION OF THE DRAWINGS

This invention will be more fully comprehended from the following detailed description taken in conjunction with the drawings in which.

DETAILED DESCRIPTION

Figure 1:
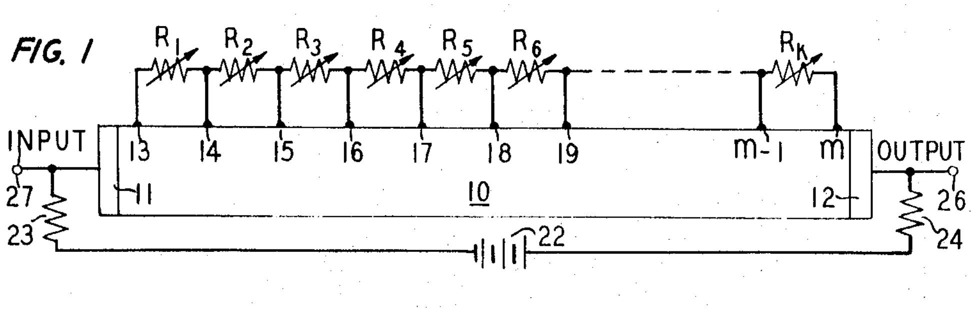
FIG. 1 is a current function generator employing a bulk semiconductor device.

A current function generator an equalizer embodying this invention is shown in FIG. 1. It employs a bulk semiconductor device 10 having a cathode 11 and an anode 12. A series of electrical contacts 13, 14, 15, 16, 17, 18, 19,... $m-1$, $m$ are bonded to one side of the semiconductive crystal. A resistor shunt path is provided between pairs of the contacts, for example, resistor $R_1$ is connected between contacts 13 and 14, resistor $R_2$ is connected between contacts 14 and 15, resistor $R_3$ is connected between contacts 15 and 16...and resistor $R_K$ is connected between contacts $m-1$ and $m$. A DC bias is maintained across the device 10 by means of source 22 connected in series between cathode 11 and anode 12 by resistors 23 and 24 respectively. The voltage of source 22 is sufficient to sustain a domain when an input pulse is applied to input terminal 27 connected to the cathode. Normally when a domain is nucleated in a bulk semiconductor device the current through the device is substantially reduced. However, as a domain passes beneath a pair of contacts the resistor connected between those contacts permits additional current to flow around the domain and through the remainder of the device. Thus, the values of the resistors $R_1$ through $R_K$ determine the shape of the output pulse generated at output terminal 26 when triggered by an input pulse at input terminal 27. By setting the resistors $R_1$ through $R_K$ to predetermined values determined in accordance with the algorithm disclosed by Lucky in the above-mentioned articles a complex waveform may be generated at output terminal 26 when triggered by an input pulse. Specifically, when the resistors are given suitable values a pulse may be spread out over a given number of time slots, $n$, with a predetermined shape, i.e., it is predistorted. In addition, the resistors $R_1$ through $R_K$ may be photoconductors so that the value of the resistors may be changed at a relatively rapid rate and the distortion introduced to the pulse changed at a relatively rapid rate. This would normally be accomplished by using a control signal to operate light sources which shine upon the photoconductors and change their resistance.

Figure 2:
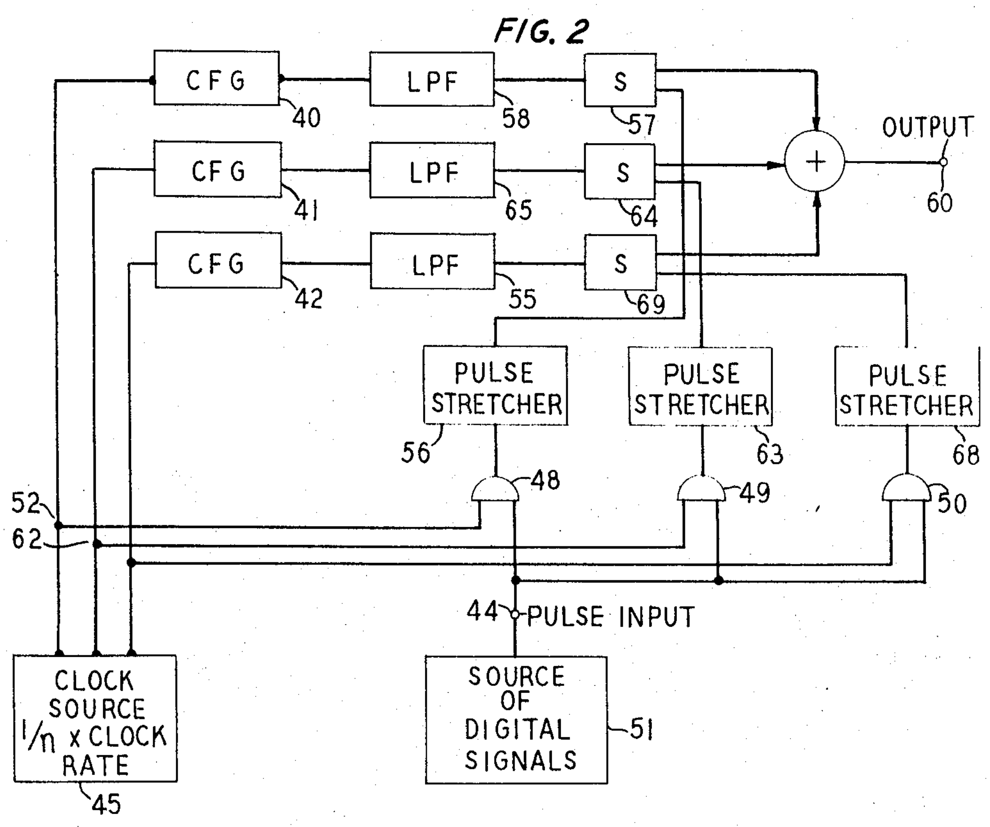
FIG. 2 is an equalizer employing three of the current function generators shown in FIG. 1.

An equalizer circuit embodying this invention is shown in FIG. 2. Since each of the bulk semiconductor function generators shown in FIG. 1 is capable of spreading a pulse over $n$ time slots, then in order to equalize an input signal, $n$, of these current functions generators are required, each of which is triggered at $1/n^{th}$ the clock rate of the input signal to be equalized. For illustrative purposes, assume that $n=3$ so that three current function generators 40, 41 and 42 of the type shown in FIG. 1 are provided. Domains are sequentially nucleated in these current function generators by a clock source 45 having three output terminals at which trigger pulses are sequentially present so that each current function generator is triggered at $1/n^{th}$ the clock rate. The pulse input signals to be equalized are applied to three AND-gates 48, 49 and 50, a first of which, gate 48, is enabled by the signal present on output terminal 52 of source 45. The output and AND-gate 48 is then applied to a pulse stretcher circuit 56 which closes a switch 57 for a period of time equal to $n$ time slots so that the output of the current function generator 40 after being applied through a low-pass filter 58 passes to the output terminal 60. As a result, the input pulse received at input terminal 44 from the source of digital signals 51 produces a stretched and predistorted output pulse at output terminal 60. The next occurring input pulse from source 51 enables AND-gate 49 so that the signal from output terminal 62 of source 45 triggers gate 49, pulse stretcher 63 and switch 64. As a result, the filtered output of current function generator 41 as it appears at the output of low-pass filter 65 is applied to the output terminal 60. Similarly, AND-gate 50, pulse stretcher 68 and switch 69 operate to apply the output of low-pass filter 55 to output terminal 60. Thus, received pulses at terminal 44 produce an output at terminal 60 which has a predetermined distortion in accordance with the techniques described in the above-mentioned Lucky article.

If at a given time slot of the pulse input signal there is a no pulse present, then none of the AND-gates 48, 49 and 50 is enabled so that no signal is applied to output terminal 60.

Figure 3:
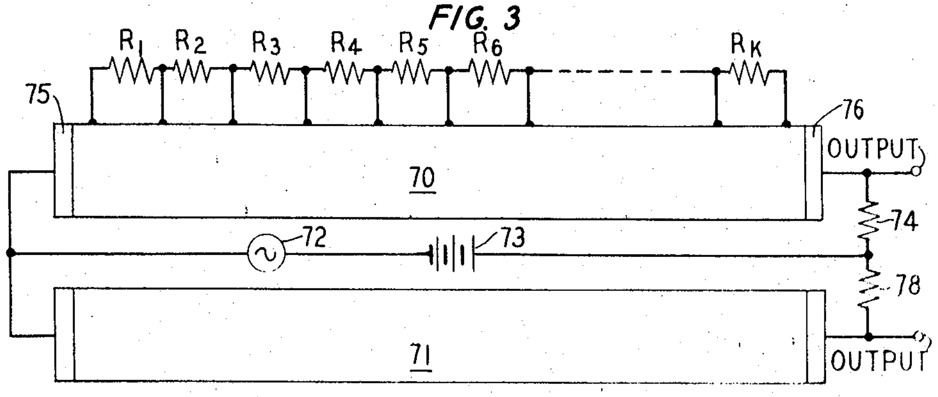
FIG. 3 is a current function generator employing a pair of bulk semiconductor devices.

While the current function generator, shown in FIG. 1, is satisfactory for use in the equalizer shown in FIG. 2, it imposes certain requirements upon the gating apparatus shown in FIG. 2 by virtue of the fact that a pulse is generated each time that a domain reaches the anode. To avoid this pulse being applied to the output, the switches 57, 64 and 69 must be closed prior to the generation of that pulse, and this requires reasonably accurate gating circuitry. To facilitate the use of relatively inexpensive gates, a second current function generator, which is shown in FIG. 3, may be employed. Here a pair of bulk semiconductor devices 70 and 71 are connected in a parallel configuration. The first device 70 has the same shunting resistors as device 10 shown in FIG. 1. The second bulk semiconductor device 71 has no shunting resistors and both devices 70 and 71 are connected to receive triggering pulses from a source 72. Source 72 is connected in series with a direct current vias voltage source 73 and a resistor 74 between the cathode 75 and anode 76 of device 70. A resistor 78 connected between the junction of resistor 74 and source 73 and the anode of device 71 completes the external circuitry of device 71. Domains are simultaneously nucleated in both devices 70 and 71 and the output of device 71 taken alone would simply be a negative pulse whose duration is equal to the time required for the domain to reach the anode. The output of device 70 is the same as that described for device 10 in FIG. 1. Since the output is taken across resistors 74 and 78, the negative pulse generated by device 71 is subtracted from the output of device 70 with the result that the pulse appearing when the domain reaches the anode of device 70 is eliminated from the output. As a result, since no pulse appears across the output when the domain is extinguished, the need for fairly accurate gating apparatus is overcome and relatively inexpensive gates may be employed.

Thus, in accordance with this invention an adjustable equalizer employing bulk semiconductor devices eliminates the need for adjusting potentiometer taps in an equalizer for a digital communications channel. The resistances which must be varied in accordance with the principles disclosed by Lucky in the above-mentioned article in Volume 44 of the *Bell System Technical Journal* are resistors which are connected between contacts bonded to the surface of the bulk semiconductor device. These resistors may be photoconductors so that the adjusting signal may be used to control a light source which in turn sets these resistance values.

It is to be understood that the above-described arrangements are merely illustrative of the principles of the invention. Numerous other arrangements may be devised by those skilled in the art without departing from the spirit and scope of the invention.

What is claimed is:

1. An equalizer comprising, in combination, a source of digital signals consisting of pulses and no pulses, $n$ bulk semiconductor devices where $n$ is an integer greater than 1 each having an anode, a cathode, and a plurality of contacts connected between the anode and cathode, a plurality of variable resistance resistors, one of said resistors being connected between adjoining contacts, means to cause a domain to be generated in each device at a rate $1/n^{th}$ the pulse repetition rate of said digital signals, filtering means to filter the output signal from each device to produce a predistorted signal, output means, and means connected to receive said digital signals to sequentially connect said filter means to said output means when a pulse is present in said digital signal.

2. An equalizer comprising, in combination, a source of digital signals consisting of pulses and no pulses, comprising, in combination, $n$ bulk semiconductor devices where $n$ is an integer greater than 1 each having an anode, a cathode, and a plurality of contacts bonded to the surface of the semiconductor device between the anode and cathode, a plurality of variable resistance resistors, one of said resistors being connected between adjoining contacts on said semiconductor device, a source of clock pulses to cause domains to be generated in each device at a rate $1/n^{th}$ the pulse repetition rate of said pulse signals from said source of digital signals, a low-pass filter connected to the anode of each semiconductor device to produce a predetermined pulse signal, output means, means responsive to said source of digital signals and said signals from said clock source to sequentially connect said filter means to said output means when a pulse is present in said digital signal.

3. An equalizer comprising, in combination, a source of digital signals which consist of pulses and no pulses comprising, in combination, $n$ bulk semiconductor devices where $n$ is an integer greater than 1 each having an anode, a cathode, and a plurality of contacts bonded to the surface of the semiconductor device between the anode and the cathode, a plurality of variable resistance resistors one of said resistors being connected between adjoining contacts on said semiconductor device, a source of clock pulses to cause domains to be sequentially generated in said devices with each device having a domain nucleated therein at a rate $1/n^{th}$ the pulse repetition rate of said signals from said source of digital signals, a low-pass filter connected to the anode of each semiconductor device to produce a predetermined pulse signal, a switch connected to the output of each low-pass filter, output means, a plurality of $n$ AND gates, each AND gate being sequentially enabled by said source of clock signals and pulses from said source of digital signals, $n$ pulse stretcher circuits each triggered by the output of an AND gate the output of each pulse stretcher being connected to a respective one of said switches to sequentially connect said filter means to said output means when a pulse is present in said digital signal.

* * * * *